United States Patent [19]
Eriksson et al.

[11] 3,976,920
[45] Aug. 24, 1976

[54] FILTERING ARRANGEMENT FOR RELAY PROTECTION DEVICES

[75] Inventors: Leif Eriksson; Lennart Thornell, both of Vasteras, Sweden

[73] Assignee: Allmanna Svenska Elektriska Aktiebolaget, Vasteras, Sweden

[22] Filed: May 22, 1975

[21] Appl. No.: 580,461

[30] Foreign Application Priority Data
June 20, 1974 Sweden.............................. 7408158

[52] U.S. Cl.................................. 317/49; 317/53; 317/27 R
[51] Int. Cl.²......................................... H02H 7/22
[58] Field of Search................ 317/49, 53, 50, 27 R, 317/36 R

[56] References Cited
UNITED STATES PATENTS
3,471,750 10/1969 Drushel.................................. 317/49
3,538,384 11/1970 Crockett............................ 317/49 X
3,754,163 8/1973 Sykes................................. 317/49 X

*Primary Examiner*—J D Miller
*Assistant Examiner*—Patrick R. Salce

[57] ABSTRACT

For filtering off of low frequency and a periodic transient phenomena in relay protection devices for electric high voltage networks, the signals of which occur in the event of a fault in the network and which are superimposed on the signals supplied to measuring relays arranged in the relay protection device, a normally short-circuited filter is included in a normally open alternative path for the measuring signal which is parallel to a part of the normal signal path. A supervisory circuit includes a time circuit, a fast fault indicator and an undervoltage detector. A signal from the fault indicator breaks the short-circuit of the filter and, upon a signal from the undervoltage detector, connects the filter in the path of the measuring signal. The measuring relay is blocked during a time interval which is equal to the difference between the pulse time of the time circuit and the time of operation of the undervoltage detector. This is accomplished by an AND-gate which has its inputs connected to the fast fault indicator and to the undervoltage detector and its output connected to a make-and-break contact for closing the alternative current path.

3 Claims, 1 Drawing Figure

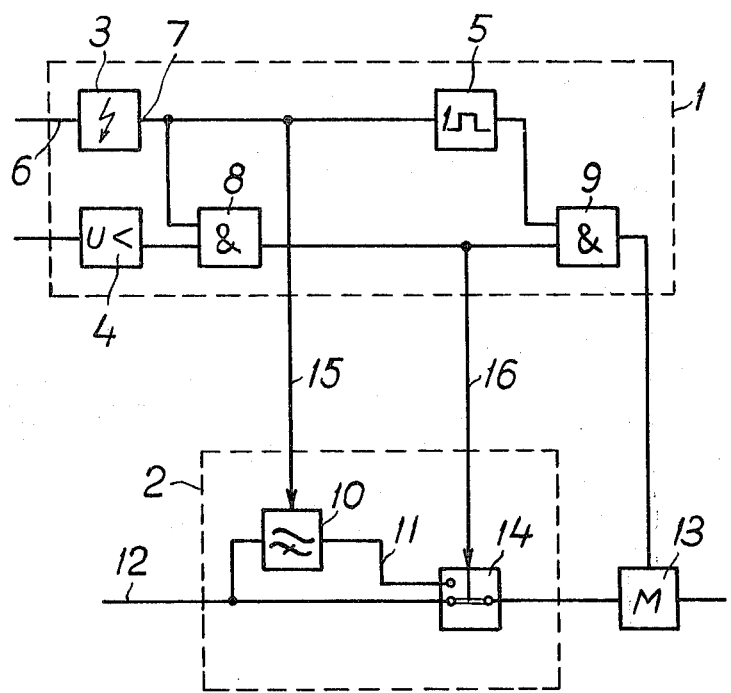

FILTERING ARRANGEMENT FOR RELAY PROTECTION DEVICES

BACKGROUND OF THE INVENTION

1. Field of the Invention

The invention relates to a filtering arrangement for relay protection devices.

2. The Prior Art

High-voltage lines can be protected by means of remote protection arrangements which requires information as to the voltage and current on the power line to make possible a selective disconnection of the faulty line. In case of high system voltages, practical and economical reasons have necessitated the use of capacitive voltage transformers (CVT) for measuring the voltage. Unfortunately, these transformers give rise to a low-frequency or aperiodic transient which is superimposed on the measuring signal. This makes itself especially felt in the case of large voltage reductions. From the voltage and the current from the measuring transformers signals are derived, which then undergo phase and amplitude comparison in the remote protection arrangement. Because of the transients there is a risk of incorrect measuring if no corrective measures are taken. A common corrective measure is to place a filter between the measuring transformer and the remote protection arrangement, and to block the measuring relay of the remote protection arrangement during the transient and building-up periods of the filter, which often results in long times of operation for the remote protection arrangement.

SUMMARY OF THE INVENTION

The present invention relates to a filtering device for relay protection devices for electric high-voltage networks for filtering low-frequency and aperiodic transient phenomena, which may occur in case of a fault in the network and which are superimposed on the signals which are supplied to the measuring relays arranged in the relay protection device. According to the invention, a normally short-circuited filter included in the arrangement is arranged in an alternative and normally open signal path for the measuring signal to the measuring relay. A supervisory circuit which contains a time circuit, a fast fault indicator and an undervoltage detector is arranged, upon a signal from the fault indicator, to break the shortcircuit of the filter and, upon a signal from the undervoltage detector, to connect the filter into the signal path of the measuring signal and to block the measuring relay during a time interval which is equal to the difference between the pulse time of the time circuit and the time of operation of the undervoltage.

BRIEF DESCRIPTION OF THE DRAWINGS

The invention will be described with reference to the accompany drawings which shows a wiring diagram of an embodiment of the invention.

DESCRIPTION OF THE PREFERRED EMBODIMENTS

The embodiment shown contains a supervisory part 1 and a signal processing part 2. There may be more than one signal processing part, but one is enough to understand the inventive concept.

The supervisory part comprises a fast fault indicator 3, an undervoltage detector 4 and a time circuit 5, which emits a pulse of a definite length. In case of a disturbance in the operation, the fault indicator receives an input signal on its input 6 and delivers an output signal on its output 7. The output signal is supplied, on the one hand, to the time circuit which starts its output pulse, and on the other hand, to an AND-gate 8. The output signal of the pulse circuit is supplied to a second AND-gate 9. If the fault is of such a nature that the undervoltage detector also operates, this delivers a signal which enters the second input of the AND-gate 8. The output signal of the AND-gate enters the second input of the second AND-gate 9 to that gate delivers an output signal.

The signal processing unit shown comprises a normally short-circuited filter 10, which is such as to be able to block in the case at low frequency and aperiodic phenomena. The filter is connected to the output of the fault indicator 3 by a conductor 15 and is arranged so that the shortcircuiting is broken when a signal appears on the output of the fault indicator. The filter is connected in an alternative signal path 11 for the measuring signal on the conductor 12 to the measuring relay 13. The connection of the alternative signal path is made with the help of a make-and-break contact device 14 of static or electromechanical design which normally keeps the signal path 11 broken, so that the measuring signal does not pass through the filter. If a fault occurs which is of such a nature that the undervoltage detector 4 also operates, a signal appears on the output of the AND-gate 8. This signal is transmitted through the conductor 16 and influences the device 14 so that the signal path 11 with the filter 10 is connected into the path of the measuring signal.

As soon as the fault indicator 3 delivers an output signal, the time circuit 5 starts and supplies a pulse of a definite duration to one input of the AND-gate 9. The AND-gate 8 delivers an output signal, on the one hand to the contact device 14 for connection of the current path 11, and on the other hand to the second input of the AND-gate 9. An output signal will then occur also on the output of the AND-gate 9, and this signal is supplied to the measuring relay 13 as a blocking signal. In such cases the mesuring relay will thus be blocked for a period which is equal to the difference between the pulse time of the circuit 5 and the time of operation of the undervoltage detector 4. If the fault is of such a nature that the detector 4 does not start working, the contact device 14 is not affected and there will be no blocking of the measuring relay 13.

The invention thus entails the advantage that the filter 10 is kept short-circuited under normal conditions in the network. Only when a fault appears and the fast fault indicator 3 operates is the shortcircuiting broken so that the filter is in working order. However, it is not connected until the undervoltage detector 4 has also operated because of such a strong undervoltage in the network that the measuring relay would not operate properly. When the filter is connected into the signal path of the measuring signal, the measuring relay is blocked to allow the filter to adjust itself to the new electrical state, thus avoiding the influence of any transient on the measuring relay. When the pulse time set on the time circuit 5 is over, the output signal disappears from the output of the AND-gate 9 and the measuring relay is released.

Because the filter is normally short-circuited and, does not contain stored energy, which is the case when the filter is permanently connected, it is not necessary to await the dying-out process which is the result of the voltage reduction across a permanently connected filter. With an arrangement according to the invention, it is only necessary to await the building-up process which occurs when the filter is connected in the event that a fault occurs. Since the building-up process can be made considerably shorter than the dying-out process, the time during which the measuring relay is blocked can be made considerably shorter than is possible with known constructions.

We claim:

1. In a relay protection device for electric high voltage networks which includes a measuring relay (13) and a signal path (12) connecting the measuring relay to the network, a filtering arrangement for filtering off low frequency and aperiodic transient phenomena which may occur in the event of a fault in the network and which are superimposed on the signal supplied to the measuring relay by such signal path, comprising a normally open alternative path (11) in parallel with a portion of said signal path, a normally short-circuited filter (10) in such alternative path, a supervisory circuit (1) comprising a time circuit (5), a fast fault indicator (3) and an undervoltage detector (4), means connecting the fast fault indicator and the undervoltage detector to the network, means (15) connected to the fast fault indicator to break the short-circuit of the filter, means (16) connected to the overvoltage detector and responsive to a signal therefrom to connect said alternative path in said signal path, and means (9) connected to the time circuit and to the undervoltage detector to block the measuring relay during a time interval which is equal to the difference between the pulse time of the time circuit and the time of operation of the undervoltage detector.

2. In a device as claimed in claim 1, the means for the alternative path in the signal line including a first AND-gate (8) having its inputs connected to the fast fault indicator and to the undervoltage detector, and a make-and-break contact (14) connected to said first AND-gate for connection of the path in the line.

3. In a device as claimed in claim 2, the means for blocking the measuring relay including a second AND-gate connected to the first AND-gate and to the time circuit.

* * * * *